(12) United States Patent
Nelson, Jr. et al.

(10) Patent No.: US 11,348,413 B2
(45) Date of Patent: May 31, 2022

(54) AUTOMATED BANKING SYSTEM

(71) Applicant: Diebold Nixdorf, Incorporated, North Canton, OH (US)

(72) Inventors: Donald S. Nelson, Jr., Akron, OH (US); Sergio de Oliveira, Massillon, OH (US); Scott Dailey, Ann Arbor, MI (US); Robert Konecny, Uniontown, OH (US); Dahae Yi, Akron, OH (US)

(73) Assignee: Diebold Nixdorf, Incorporated, Hudson, OH (US)

( * ) Notice: Subject to any disclaimer, the term of this patent is extended or adjusted under 35 U.S.C. 154(b) by 830 days.

(21) Appl. No.: 15/523,089

(22) PCT Filed: Nov. 2, 2015

(86) PCT No.: PCT/US2015/058603
§ 371 (c)(1),
(2) Date: Apr. 28, 2017

(87) PCT Pub. No.: WO2016/070177
PCT Pub. Date: May 6, 2016

(65) Prior Publication Data
US 2017/0337782 A1    Nov. 23, 2017

Related U.S. Application Data

(60) Provisional application No. 62/073,255, filed on Oct. 31, 2014, provisional application No. 62/233,009, (Continued)

(51) Int. Cl.
*G07F 19/00* (2006.01)
*E04H 1/12* (2006.01)
(Continued)

(52) U.S. Cl.
CPC .......... *G07F 19/202* (2013.01); *E04H 1/12* (2013.01); *G06Q 20/1085* (2013.01);
(Continued)

(58) Field of Classification Search
None
See application file for complete search history.

(56) References Cited

U.S. PATENT DOCUMENTS

| 3,949,364 A | 4/1976 | Clark et al. |
| 4,343,582 A | 8/1982 | Lundblad et al. |

(Continued)

FOREIGN PATENT DOCUMENTS

| CN | 101268485 A | 9/2008 |
| DE | 102008019233 A1 | 9/2009 |

(Continued)

OTHER PUBLICATIONS

International Search Report and Written Opinion, dated Jan. 12, 2016, for corresponding International Patent Application PCT/US2015/058603.

(Continued)

*Primary Examiner* — Jason Borlinghaus
(74) *Attorney, Agent, or Firm* — Black, McCuskey, Souers & Arbaugh LPA

(57) ABSTRACT

In an example embodiment, there is disclosed herein an apparatus comprising a first terminal that comprises a first display, a first wireless interface, and a first cash interface, and a second terminal that comprises a second display, a second wireless interface, and a second cash interface. Control logic is coupled with the first user interface and the second user interface and operable to control the operation of the first and second displays, first and second wireless interfaces, and first and second cash interfaces. A safe is coupled with the control logic, and the first and second cash (Continued)

interfaces. The control logic is operable to have cash selectively delivered from the safe to the first cash interfaces responsive to cash withdrawal transactions conducted at the first terminal and to the second cash interface responsive to cash withdrawal transactions conducted at the second terminal.

18 Claims, 12 Drawing Sheets

Related U.S. Application Data filed on Sep. 25, 2015, provisional application No. 62/239,589, filed on Oct. 9, 2015, provisional application No. 62/246,038, filed on Oct. 24, 2015.

(51) Int. Cl.
| | | |
|---|---|---|
| *G06Q 20/32* | (2012.01) | |
| *G06Q 20/10* | (2012.01) | |
| *E05G 7/00* | (2006.01) | |
| *H04W 4/80* | (2018.01) | |
| *G06F 3/0482* | (2013.01) | |
| *G06F 3/0486* | (2013.01) | |
| *G06F 3/04883* | (2022.01) | |
| *G06F 3/14* | (2006.01) | |

(52) U.S. Cl.
CPC ......... *G06Q 20/327* (2013.01); *G07F 19/203* (2013.01); *G07F 19/205* (2013.01); *G07F 19/211* (2013.01); *E05G 7/002* (2013.01); *G06F 3/0482* (2013.01); *G06F 3/0486* (2013.01); *G06F 3/04883* (2013.01); *G06F 3/1423* (2013.01); *G07F 19/206* (2013.01); *H04W 4/80* (2018.02)

(56) References Cited

U.S. PATENT DOCUMENTS

| | | |
|---|---|---|
| 5,600,114 A | 2/1997 | Dunlap et al. |
| 6,796,490 B1 | 9/2004 | Drummond et al. |
| 2001/0042042 A1* | 11/2001 | Stokes ................ G06Q 20/108 |
| | | 705/42 |
| 2006/0183505 A1* | 8/2006 | Willrich ................ G06F 1/1616 |
| | | 455/566 |
| 2008/0091601 A1 | 4/2008 | Uchida |
| 2012/0023017 A1* | 1/2012 | Votaw ................ G06Q 20/1085 |
| | | 705/43 |
| 2012/0044154 A1* | 2/2012 | Black ................ G07F 19/205 |
| | | 345/173 |
| 2012/0054099 A1 | 3/2012 | Fox et al. |
| 2012/0314076 A1 | 12/2012 | Da Silva et al. |
| 2013/0191287 A1 | 7/2013 | Gainer, III et al. |
| 2014/0279415 A1* | 9/2014 | Hazam ................ G06Q 20/10 |
| | | 705/39 |
| 2017/0091731 A1 | 3/2017 | Nelson |

FOREIGN PATENT DOCUMENTS

| | | |
|---|---|---|
| EP | 0959439 A1 | 11/1999 |
| EP | 1710980 A2 | 10/2006 |
| EP | 2587431 A1 | 5/2013 |
| GB | 2461781 A | 1/2010 |
| GB | 2461781 A | 1/2010 |
| WO | 2004006350 A2 | 1/2004 |
| WO | 2004010392 A2 | 1/2004 |
| WO | 2008012841 A1 | 1/2008 |

OTHER PUBLICATIONS

Office Action and Search Report filed in the corresponding Chinese application dated Apr. 3, 2019; 6 pages.
Preliminary Opinion issued by the European Patent Office; 19 pages.

* cited by examiner

AUTOMATED BANKING SYSTEM

CROSS REFERENCE TO RELATED APPLICATIONS

This application is a national phase entry of PCT/US2015/058603 that claims the benefit under 35 U.S.C. § 119 of U.S. Provisional Application No. 62/073,255 filed Oct. 31, 2014, U.S. Provisional Application No. 62/239,589 filed Oct. 9, 2015, U.S. Provisional Application No. 62/246,038 filed Oct. 24, 2015, and U.S. Provisional Application No. 62/233,009 filed Sep. 25, 2015. The aforementioned applications are in their entirety hereby incorporated by reference herein.

TECHNICAL FIELD

The present disclosure relates generally to automated banking machines.

BACKGROUND

Automated banking machines may operate to allow an authorized system user to carry out at least one transaction which is operative to transfer value to or from at least one account. A record of the transaction is recorded and a copy of the transaction may be provided to the user. A common type of automated banking machine used by consumers is an automated teller machine (ATM) which enables customers to carry out banking transactions. Banking transactions carried out may include the dispensing of cash, the making of deposits, the transfer of funds between accounts and account balance inquiries. The types of transactions a customer can carry out with an automated transaction machine are determined by the capabilities of the particular machine and the programming associated with operating the machine. For purposes of this disclosure an automated banking machine, an automated transaction machine, or an ATM shall be deemed to include any machine that may be used to electronically carry out transactions involving automated transfers of value.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
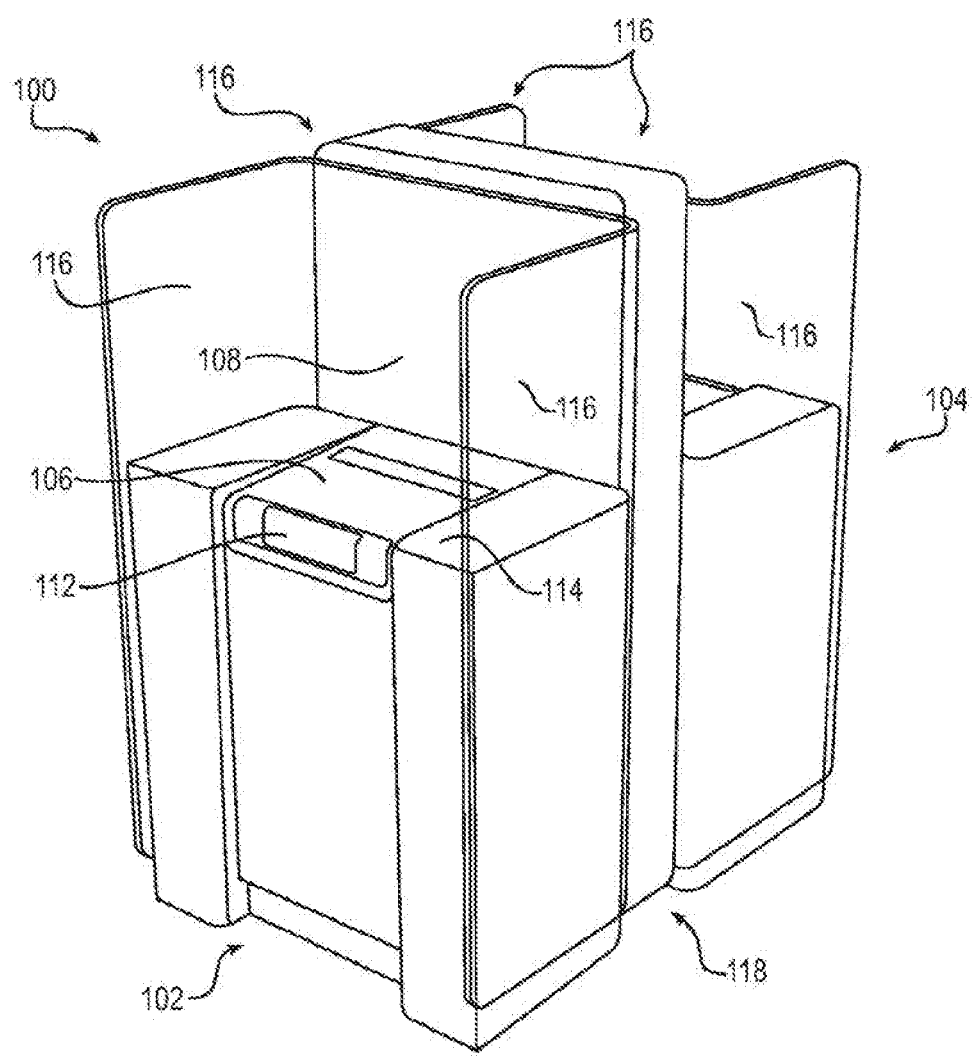
FIG. 1 illustrates an example of an automated banking machine configured to accommodate a plurality of users.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, In an example embodiment, there is disclosed herein an apparatus comprising a first terminal that comprises a first display, a first wireless interface, and a first cash interface, and a second terminal that comprises a second display, a second wireless interface, and a second cash interface. Control logic is coupled with the first user interface and the second user interface and operable to control the operation of the first and second displays, first and second wireless interfaces, and first and second cash interfaces. A safe is coupled with the control logic, and the first and second cash interfaces. The control logic is operable to have cash selectively delivered from the safe to the first cash interfaces responsive to cash withdrawal transactions conducted at the first terminal and to the second cash interface responsive to cash withdrawal transactions conducted at the second terminal.

In accordance with an example embodiment, there is disclosed herein, an automated banking machine with a display and a wireless interface. When a user associates with the automated banking machine via the wireless interface, data representative of queued transactions is provided to the automated banking machine. The user is then presented with the queued transactions on the display instead of the automated banking machines menu, allowing the user to perform the queued transactions without having to navigate the automated banking machine's menu.

In accordance with an example embodiment, there is disclosed herein, an automated banking machine with a display and an input device selected from a group consisting of a touch screen input and a gesture input. While a user is conducting a deposit transaction, the automated banking machine displays accounts associated with the user and a visual representation of the deposited item or items. The user then uses the touch screen input or the gesture device to indicate which account to deposit the deposited item. In particular embodiments, a plurality of deposit items are scanned by a scanner that scans the deposit items while they are on the display device. The user can then use the input device to select the account for depositing individual deposit items belonging to the plurality of deposit items.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Figure 3:
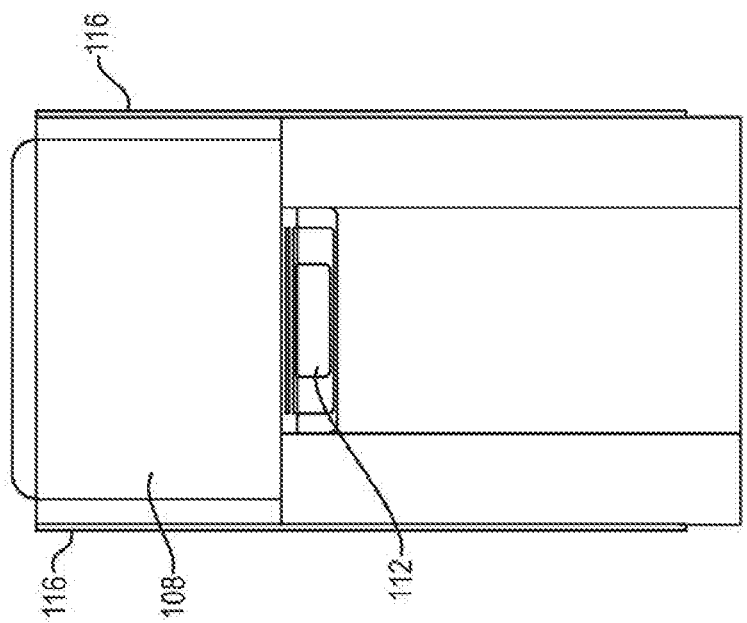
FIG. 3 is a side view of the automated banking machine illustrated in FIG. 1.
Figure 2:
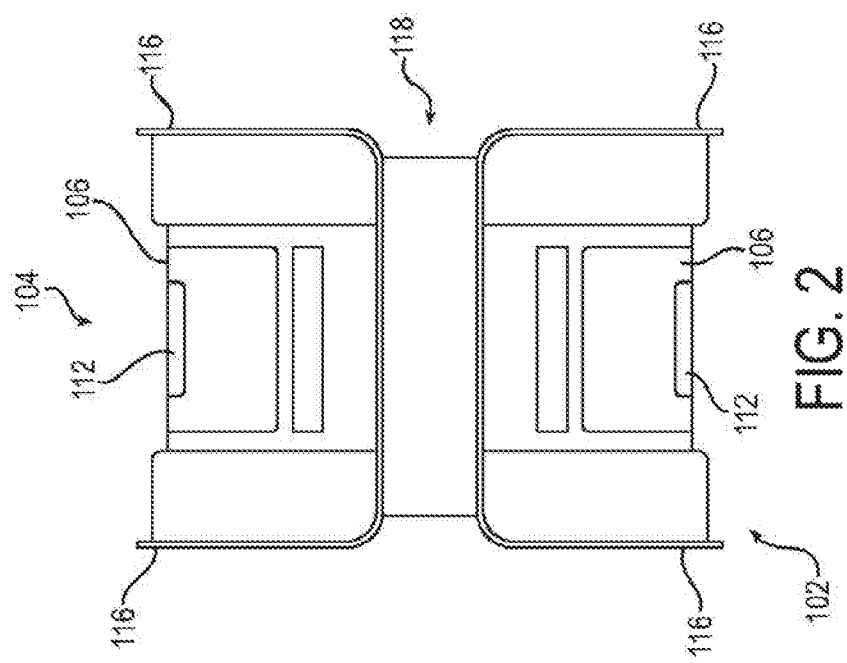
FIG. 2 is a top view of the automated banking machine illustrated in FIG. 1.

Referring to FIGS. 1-3 there is illustrated an example of an automated banking machine 100 configured to accommodate a plurality of users. The automated banking machine comprises a first terminal 102 and a second terminal 104. In an example embodiment, terminals 102 and 104 mirror each other, however, in other embodiments, terminals 102 and 104 may be configured differently.

The terminals 102, 104 comprise a first user interface 106 that is employed for conducting transactions. In an example embodiment, first user interface 106 is a touch screen display. In particular embodiments, first user interface 106 is further operable to detect gestures from users operating the terminal. As will be described herein, gestures may be used to scroll through menus and/or to make selections.

A second user interface 108 is employed for videoconferencing to assist a customer in conducting a transaction or provide other information. As will be described herein, the user may select a "HELP" icon to request assistance. The user interface 108 is operable to provide audio and visual signals.

For withdrawal, a "one slot" cash interface 112 is employed to provide a user with the cash. In an example embodiment, the cash interface can provide currency notes and coins.

In an example embodiment, a scanner 114 is provided adjacent to user interface 106. In another example embodiment, the user interface 106 has scanning capabilities. As will be described herein, the scanner 114, or scanner in user interface 106, may be employed in deposit transactions. For example, the scanner 114 may be employed to scan checks or other items for deposit. In particular embodiments, the scanner 114 can be employed to scan barcodes, such as, for example, a two dimensional barcode such as a (Quick Response) QR code.

In an example embodiment, the automated banking machine comprises a privacy panel 116. Privacy panel 116 can prevent outsiders from overlooking the user interfaces 106, 108 while a transaction is in progress.

In an example embodiment, a central area 118 is provided for housing a safe (not shown, see e.g., FIG. 4) where currency is stored and a controller (not shown, see e.g., FIG. 4), such as a processor. In particular embodiments, the user interfaces 106, 108 of both user areas 102, 104 share the same safe and controller. The safe may employ one or multiple shuttles for providing the cash requested in withdrawals from the safe to the cash interface 112. In some embodiments, the controller may be located remotely from automated banking machine 100.

Although the illustrated example shows two user areas 102, 104, those skilled in the art should readily appreciate that the automated banking machine 100 may suitably comprise any suitable number of user areas. Moreover, the location of user areas 102, 104 with respect to each other may also vary (for example they may be located side by side or they may be located at an angle less than one hundred and eighty degrees from each other. Thus, the principles described herein should not be construed as limited to the illustrated configuration.

Figure 4:
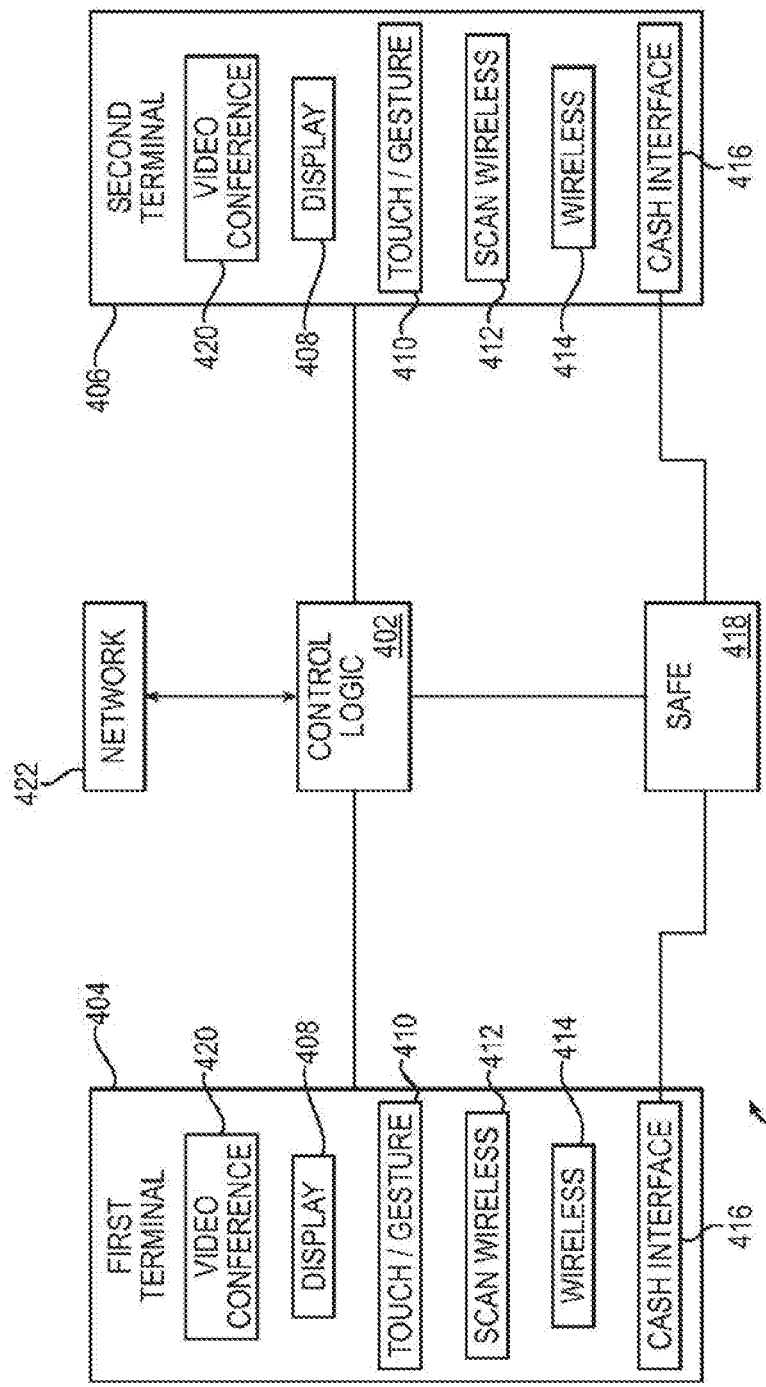
FIG. 4 is a block diagram illustrating an example of the functional components of the automated banking machine illustrated in FIG. 1.

FIG. 4 is a block diagram illustrating an example of the functional components 400 of the automated banking machine illustrated in FIG. 1. The functional components comprise control logic (e.g. a processor) 402 for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

In an example embodiment, the controller is coupled to first terminal interface 404 (e.g., interfaces 106, 108 on first terminal 102 in FIG. 1) and second terminal interface 406 (e.g., interfaces 106, 108 on second terminal 104 in FIG. 1). The first and second terminal interfaces 404, 406 comprise a display 408 for outputting data. The display 408 that is operable to visually output data, and in particular embodiments, may also provide audio and/or vibratory signals (for example vibratory signals may be employed for site impaired users).

In an example embodiment, the first terminal interface 404 and second terminal interface 406 further comprise a touch screen and/or gesture input device 410. For example, a touch screen may read touch coordinates when a user touches a screen for determining user selections. Cameras or other visual input devices may be employed for detecting gestures and control logic 402 may be operable to respond to detected gestures (e.g., scroll through a menu or determine a menu selection).

In an example embodiment, the first terminal interface 404 and second terminal interface 406 further comprise a scanner interface 412. As will be described herein infra, the scanner interface 412 may be an impendent device or may be implemented in conjunction with another device such as display 408.

In an example embodiment, the first terminal interface 404 and second terminal interface 406 further comprise a wireless interface 414. The wireless interface may be any suitable wireless interface for communicating with a user's wireless device. In an example embodiment, the wireless interface is a NFC (near field communication) interface, however, those skilled in the art can readily appreciate that any suitable wireless protocol may be employed. As will be described herein infra, the wireless interface 414 allows the control logic 402 to obtain data representative of queued transactions from a user's wireless device, which can allow a user to skip the automated banking machine's menus and proceed directly to the queued transactions. User authentication data may also be obtained via wireless interface 414. In particular embodiments, user authentication may employ multiple devices. For example, the wireless interface 414 may obtain user identification data and the user may input a PIN (personal identification number) via another device such as the touch screen and/or gesture input device 410.

In an example embodiment, the first terminal interface 404 and second terminal interface 406 further comprise a cash slot 416. The cash slot 416 is operable to receive cash from the safe 418. The control logic 402 is coupled with safe 418 and is operable to instruct logic (not shown) in the safe 418 to deliver an amount of cash for a cash withdrawal to the appropriate cash interface 416 (e.g., either cash interface 416 in first terminal interface 404 or cash interface 408 in second terminal interface 406).

In an example embodiment, the first terminal interface 404 and second terminal interface 406 further comprise a videoconferencing interface 420. The videoconferencing interface can allow a user to have obtain help or speak with a representative while conducting a transaction employing the display 408, touch/gesture input device 410 and/or scan interface 412. The videoconferencing interface 420 may be positioned so that the representative can watch the user attempt to perform transaction on display 408.

In an example embodiment, the control logic 402 is coupled with a network 422. This can allow inter alia the control logic 402 to communicate with a financial institution's computer (not shown) to authenticate a user, communication transaction data, and obtain approval for a transaction. As those skilled in the art can readily appreciate an aspect of an example embodiment is that a connection to network 422 may be shared by first terminal 404 and second terminal 406.

In an example embodiment, the display 408, touch/gesture input device 410, and wireless interface 414 are combined for the first user interface 106 in FIG. 1. The videoconference interface 420 is employed for the second user interface 108 in FIG. 1. In particular embodiments, the control logic 402 may employ the first user interface 106 in FIG. 1 with the scanner interface 412 as will be described in more detail herein infra. For example, the control logic 402 may be employed for providing the user interfaces and performing, or causing the performing of, the activities described in FIGS. 7-15.

In an example embodiment, the controller 402 comprises logic for monitoring the first terminal 404, the second terminal 406, and the safe 418. For example, the control logic 402 may monitor the amount of cash available is available in the safe 418 that can be dispensed by the first terminal 404 and the second terminal 406. Upon detection of an abnormal condition, e.g., one of the first terminal 404 or second terminal 406 may need servicing, the control logic 402 may send a message to an appropriate resource via network 422.

In an example embodiment, the controller 402 comprises logic for providing security to the first terminal 404 and the second terminal 406. For example, the control logic 402 may comprises logic for detecting tapering of cash interface 416 in first terminal 404, cash interface 416 in second terminal 406, and/or safe 418. Alarms may be transmitted to remote hosts via network 422.

Figure 5:
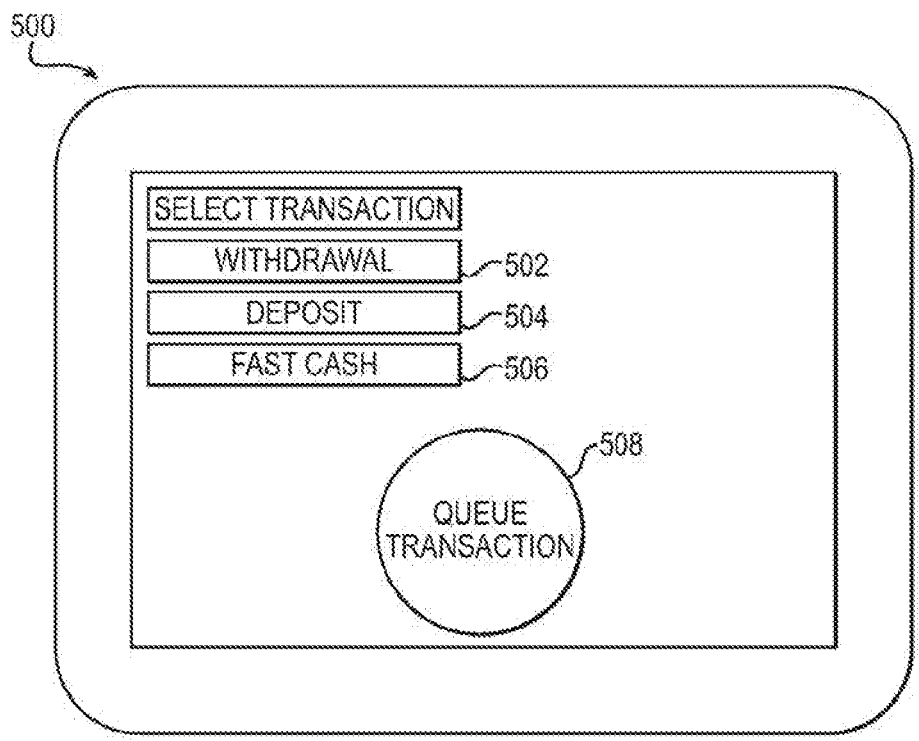
FIG. 5 illustrates an example of a user interface for a portable device to allow a user prepare and queue transactions for an automated banking machine.

FIG. 5 illustrates an example of a user interface for a portable device 500 to allow a user to prepare and queue transactions for an automated banking machine. The user interface comprises a withdrawal icon 502 for queuing cash withdrawals, a deposit icon 504 for queuing one or more deposit transactions, and in particular embodiments may further include additional icons such as fast cash icon 506.

A user selects the queued transaction icon 508 to add, edit, or delete queue transactions. For example, the user may select the queue transaction icon 508 to view currently queued transaction, and may employ one or more of icons 502, 504, 506 to add additional transactions.

For example, the user may select the withdrawal icon 502 to queue a cash withdrawal transaction. The user may be provided with a list of accounts, and in particular embodiments, current balances for the listed accounts. The user may then select the account to make the withdrawal from and input the amount of the withdrawal.

Figure 6:
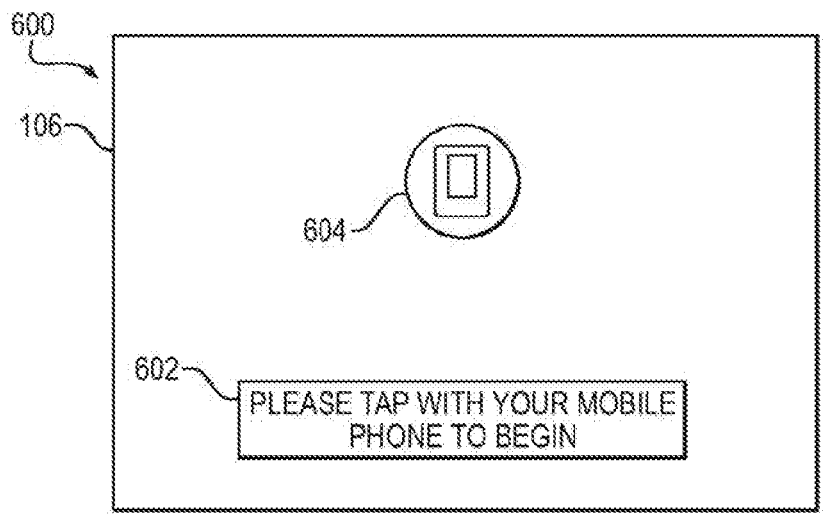
FIG. 6 illustrates an example of a user interface of an automated banking machine while waiting for a customer.

FIG. 6 illustrates an example of a user interface 600 of an automated banking machine while waiting for a customer. As illustrated, the user interface 600 is provided on display 106 of the automated banking machine 100 described in FIGS. 1-3. The user interface provides instructions to tap a mobile phone to begin in box 602. An icon 604 is provided to indicate to the user where to tap the mobile phone.

In an example embodiment, when the user taps icon 604, the user is authenticated and the icon 604 changes. For example, the icon 604 may display a photograph of the customer and may be moved to a part of the display not used for transactions. In addition, a greeting may be provided when the user signs in. An aspect of this example embodiment is that a user does not need a card, nor does the automated banking machine employ a card reader for authenticating a user.

Figure 7:
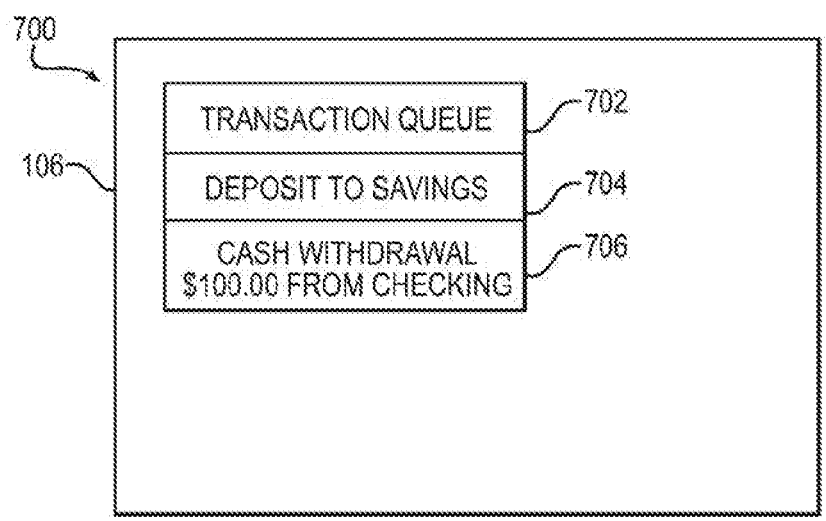
FIG. 7 illustrates an example user interface of an automated banking machine that allows a user to manipulate a transaction queue.

FIG. 7 illustrates an example user interface 700 of an automated banking machine that allows a user to manipulate a transaction queue. As illustrated, the user interface 600 is provided on display 106 of the automated banking machine 100 described in FIGS. 1-3.

The user interface 700 has a transaction queue icon 702 to indicate that queued transactions have been provided to the automated banking machine and are being displayed. In the illustrated example, the queued transactions are a deposit to savings 704 and a $100.00 cash withdrawal from checking.

When the user selects a transaction (e.g., either icon 704 or 706), the user has the option to modify the transaction (e.g., change the amount of cash requested in the cash withdrawal transaction) or cancel the transaction. As will be described in further detail herein infra, for deposit transactions the user may input an amount of the transaction, while in other embodiments the amount of the deposit will be determined by scanning the document being deposited and the user is provided with an option to accept or edit the amount of the deposit determined by the scan. In an example embodiment that will described herein infra, the user may select an account for a deposit after the deposited item has been scanned.

An aspect of the example embodiments just described is that it allows a user to skip the automated banking machine menus and go directly to queued transactions. This can enhance the user experience since the user does not have to learn how to navigate through the automated banking machines menus and saves time while performing transactions at the terminal does not have to input amounts for a transaction.

Figure 8:
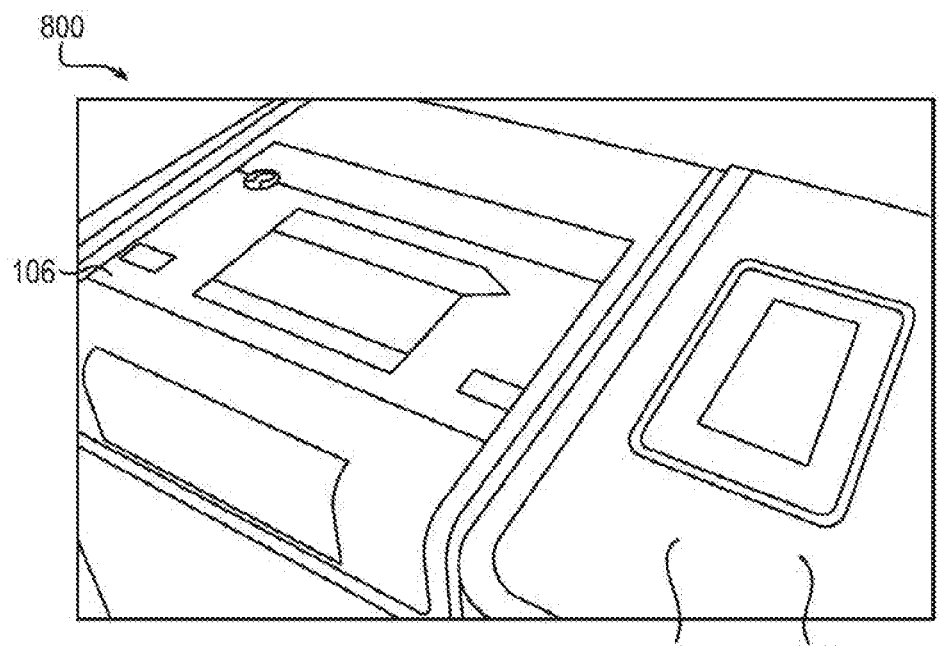
FIG. 8 illustrates an example of a user interface for scanning a deposit.

FIG. 8 illustrates an example of a user interface 800 for scanning a deposit. As illustrated, the user interface 600 is provided on display 106 of the automated banking machine 100 described in FIGS. 1-3. Instructions for scanning the deposit item are provided on user interface 106 on scanner 114. In the illustrated example, a visual indication 802 is provided to indicate to the user where the item being deposited should be placed in order to be scanned. In particular embodiments, the color of the visual indication 802 may be changed to indicate when scanning is completed.

Figure 9:
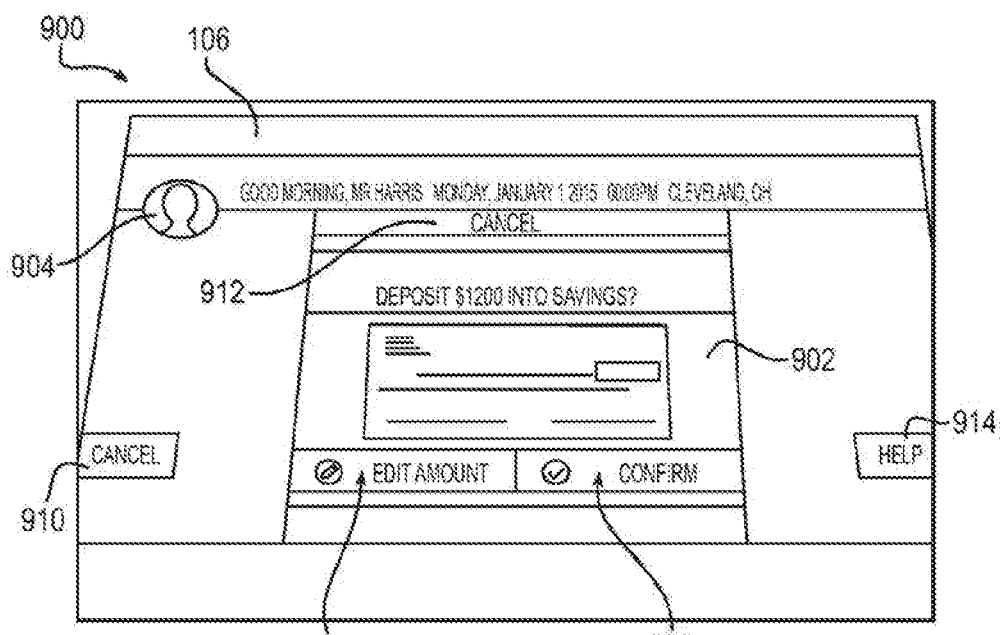
FIG. 9 illustrates an example of a user interface for confirming a scanned deposit.
Figure 15:
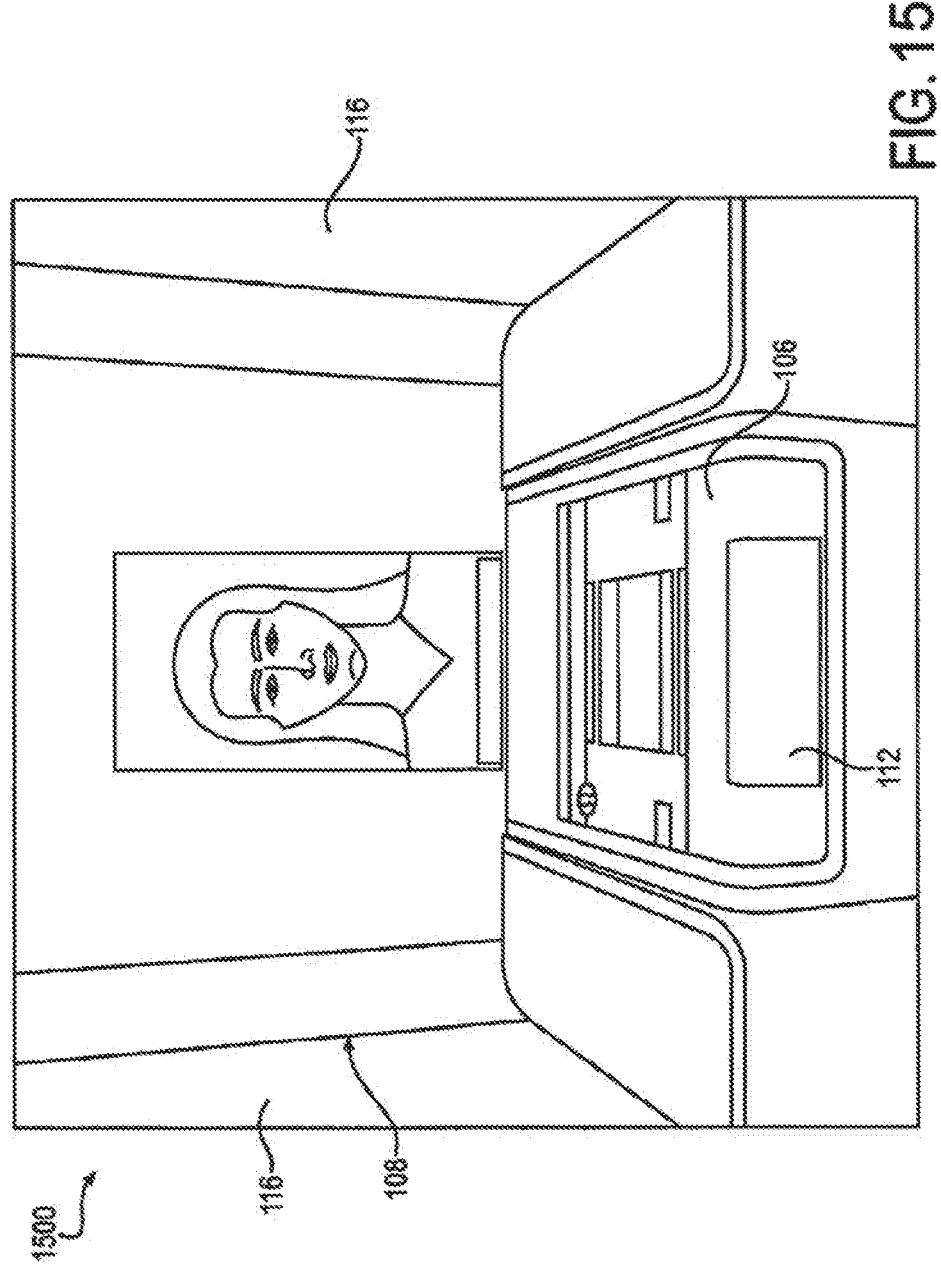
FIG. 15 illustrates an example of a videoconference while conducting a transaction.

FIG. 9 illustrates an example of a user interface 900 for confirming a scanned deposit. As illustrated, the user interface 600 is provided on display 106 of the automated banking machine 100 described in FIGS. 1-3. This user interface 900 may be employed upon scanning a deposit item via scanner 114 as described in FIG. 8. The user interface 900 provides a graphical representation 902 of the deposited item along with data indicating the amount determined for the deposited item. Icon 904 displays a visual depiction of the user. The user interface 900 allows for a user to edit the amount of the deposit using edit icon 906, confirm the amount of the deposit using confirm icon 908, or cancel the deposit using either of cancel icon 910 or cancel icon 912. The user interface 900 also has a "HELP" icon 914 which can be employed to initiate a videoconference or obtain other assistance that will be described in more detail herein infra (see e.g., FIG. 15). As indicated in FIG. 15, the videoconference may occur on user interface 108 while the deposit transaction is pending on display 106.

Figure 10:
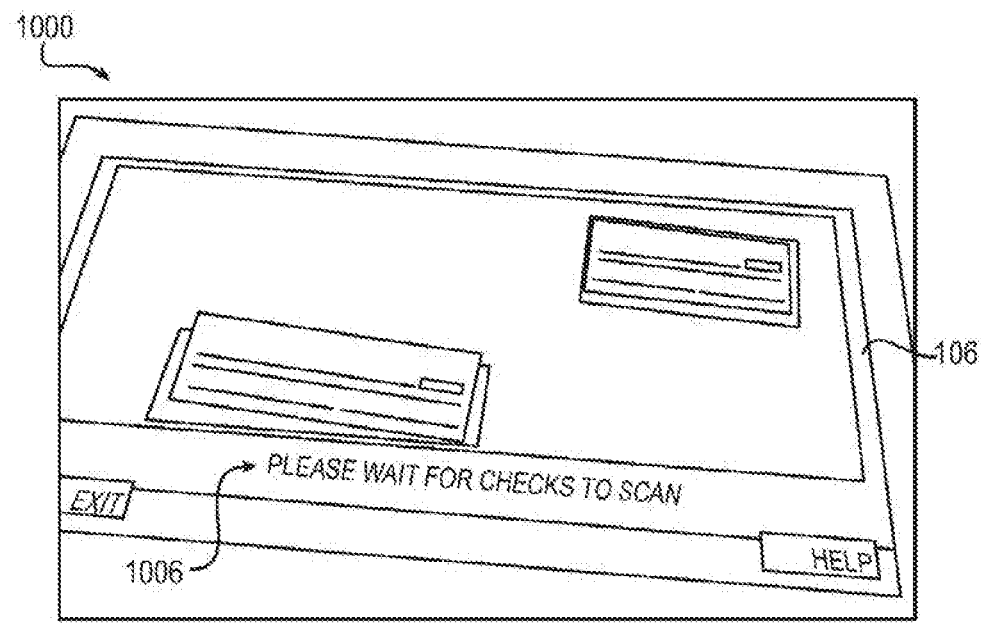
FIG. 10 illustrates an example user interface for depositing multiple checks.

FIG. 10 illustrates an example user interface 1000 for depositing multiple checks. As illustrated, the user interface 1000 is provided on display 106 of the automated banking machine 100 described in FIGS. 1-3. In an example embodiment, As will be described in more detail herein, user interface 1000 may also allow the checks to be selectively deposited into multiple accounts. Checks 1002 and 1004 are placed on display 106. A message 1006 is displayed requesting the user to wait while the checks are being scanned. In particular embodiments, a visual indication may be provided around the checks to indicate which checks are being scanned and the color may indicate the progress of the scan (e.g., red—scan unsuccessful, yellow—scan in progress, green—scan successful).

In to other example embodiments, the user interface 1000 may be employed for scanning other items, such as, for example, photo identification, (Automatic Teller Machine) ATM cards to enable a user to enroll in (near field communication) NFC authorization.

Figure 11:
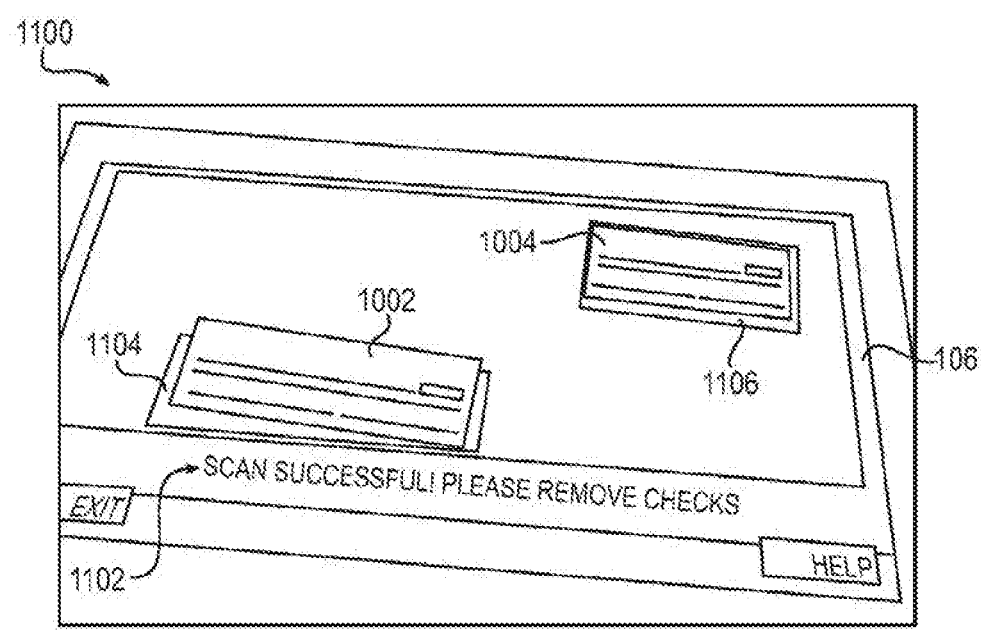
FIG. 11 illustrates an example of a successful scan indication for depositing multiple checks.

FIG. 11 illustrates an example of a successful scan indication for depositing multiple checks. As illustrated, the user interface 1100 is provided on display 106 of the automated banking machine 100 described in FIGS. 1-3. A message 1104 prompts the user to remove the checks from display 106. In the illustrated example, a visual indication 1104 is provided to indicate that check 1002 scanned successfully and visual indication 1006 is provided to indicate that check 1004 scanned successfully.

Figure 12:
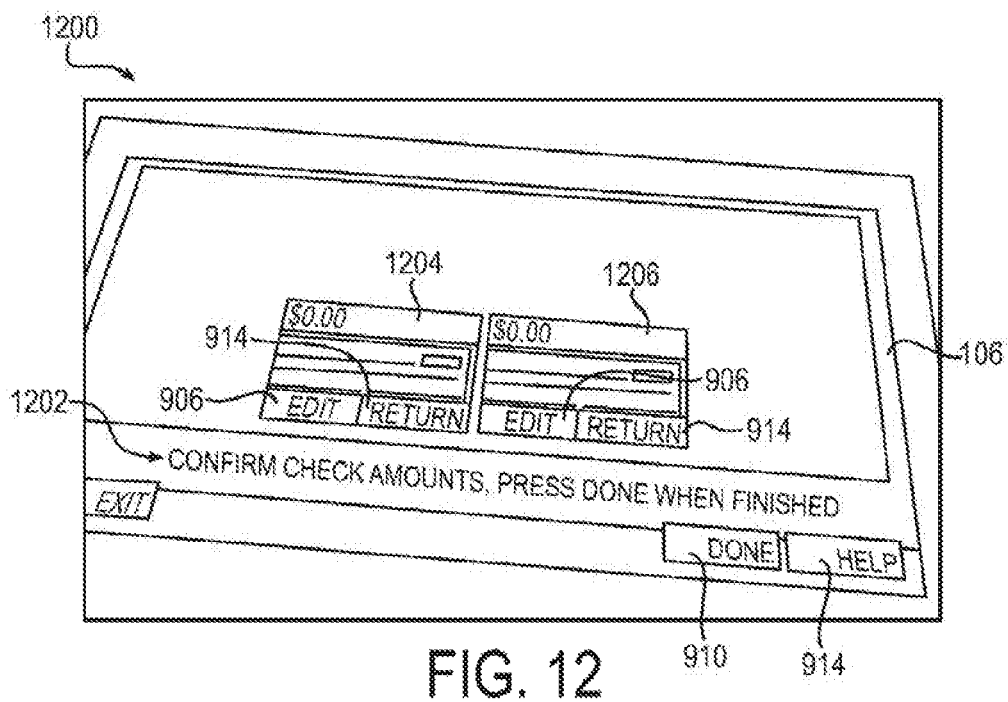
FIG. 12 illustrates an example user interface allowing for confirming individual checks in a multiple check deposit.

FIG. 12 illustrates an example user interface 1200 allowing for confirming individual checks in a multiple check deposit. As illustrated, the user interface 1200 is provided on display 106 of the automated banking machine 100 described in FIGS. 1-3. The user interface comprises a message 1202 prompting the user to confirm the amounts of the checks. A visual representation 1204, 1206 of the checks (1002, 1004 respectively in this example) is provided to allow the user to view the scanned images. The user can employ edit icons 906 to edit the amount of a check or confirm icon 914 to confirm the amount of the check.

Figure 13:
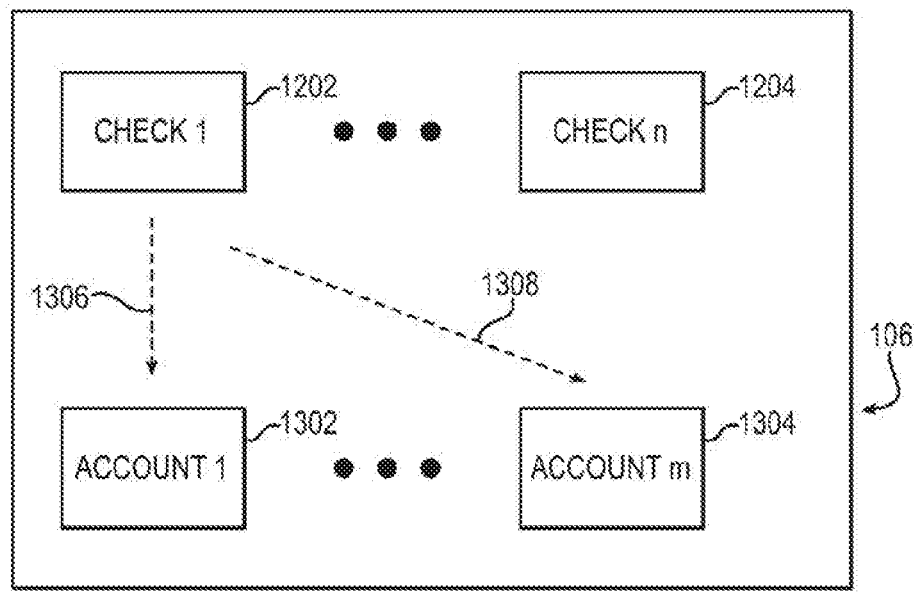
FIG. 13 illustrates an example of selecting accounts for depositing checks.

FIG. 13 illustrates an example of a user interface 1300 for selecting accounts for depositing checks. As illustrated, the user interface 1300 is provided on display 106 of the automated banking machine 100 described in FIGS. 1-3. Visual representations 1202, 1204 of checks 1 through n (where n is an integer greater than 1) are displayed on the user interface 1300. Accounts 1 through m (where m is an integer greater than 1) are also displayed on user interface 1300. The user may employ either gestures or using a finger drag a visual representation of a check to the account receiving the deposit. For example, as indicated on FIG. 13 by line 1306, a gesture or finger dragging of the visual representation 1202 can be employed to deposit the first check (Check 1) into a first account (account 1) 1302, or as indicated by line 1308, a gesture or finger dragging of the visual representation 1202 can be employed to deposit the first check (Check 1) into a second account (account m) 1304. As those skilled in the art can readily appreciate, the number of checks selected for the illustrated example was chosen merely for ease of illustration of an example embodiment and that user interface 1300 may be employed to select an account from multiple accounts to selectively deposit a single check, or may be employed to selectively deposit any physically realizable number of checks into accounts selected from any physically realizable number of accounts.

Figure 14:
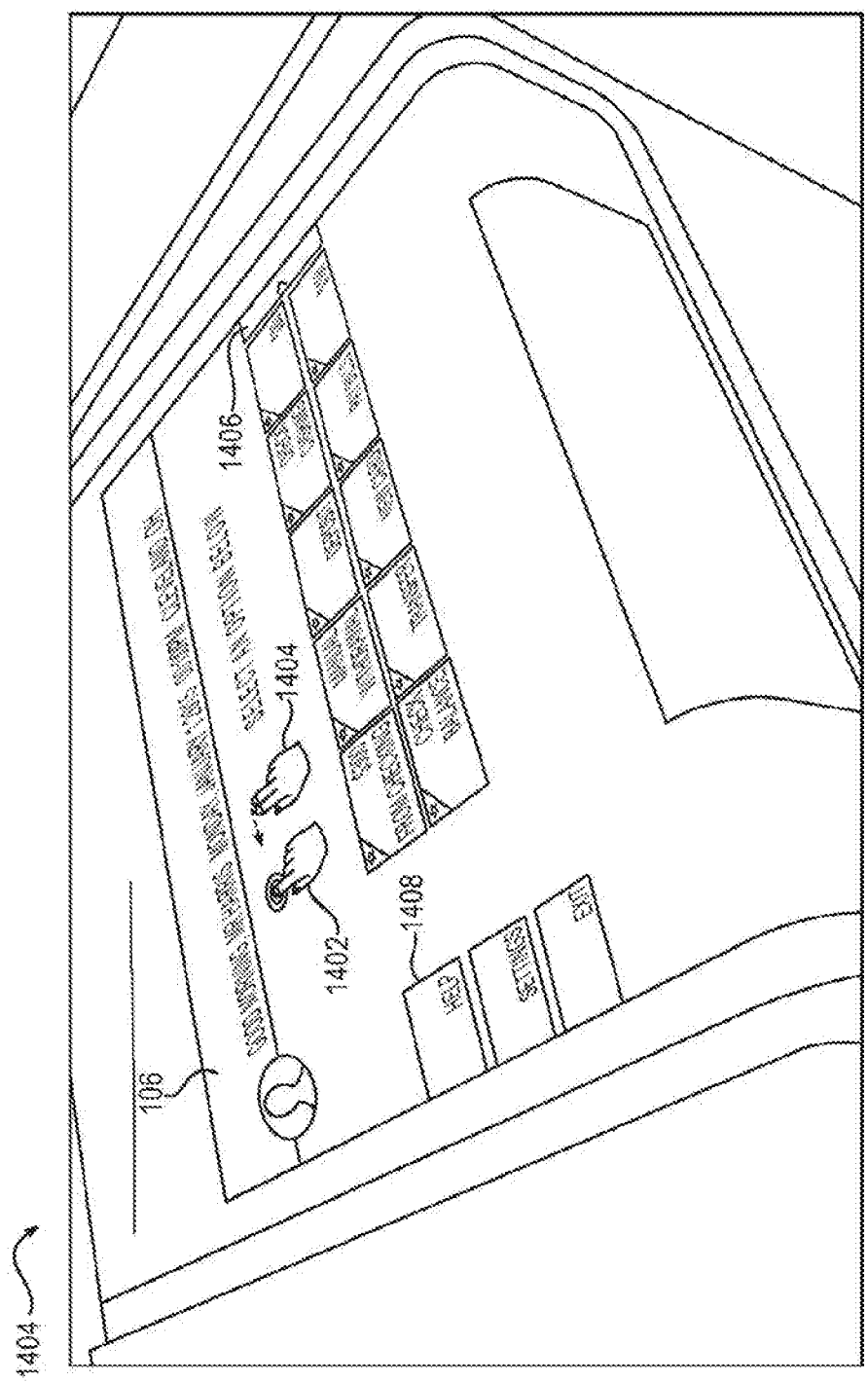
FIG. 14 illustrates an example of a menu driven interface.

FIG. 14 illustrates an example of a menu driven interface 1400. As illustrated, the user interface 1400 is provided on display 106 of the automated banking machine 100 described in FIGS. 1-3. The menu driven interface 1400 may be provided when there are no queued transactions, or if requested by the user. The menu driven interface 1400 displays an icon 1402 indicating that the user should touch the screen to select a transaction, icon 1404 to indicate that the user can use gestures to scroll through the menu. Icon 1406 indicates that additional transaction types are available by scrolling through the menu. Icon 1408 can be employed to request HELP (e.g, either displayed on the screen or a videoconference as will be described in FIG. 15 herein infra).

FIG. 15 illustrates an example of a videoconference 1500 that can occur while conducting a transaction. As illustrated, the video conference 1500 is provided on display 108 of the automated banking machine 100 described in FIGS. 1-3. The videoconference can occur while the user is employing user interface 106 for attempting to perform a transaction.

In an example embodiment, videoconferencing is employed by a service representative at a remote host to assist the user in performing a transaction. In an example embodiment, the user interface at the remote host may be operable to display the user's transaction queue (see e.g., 702, 704, 706 in FIG. 7).

Figure 16:
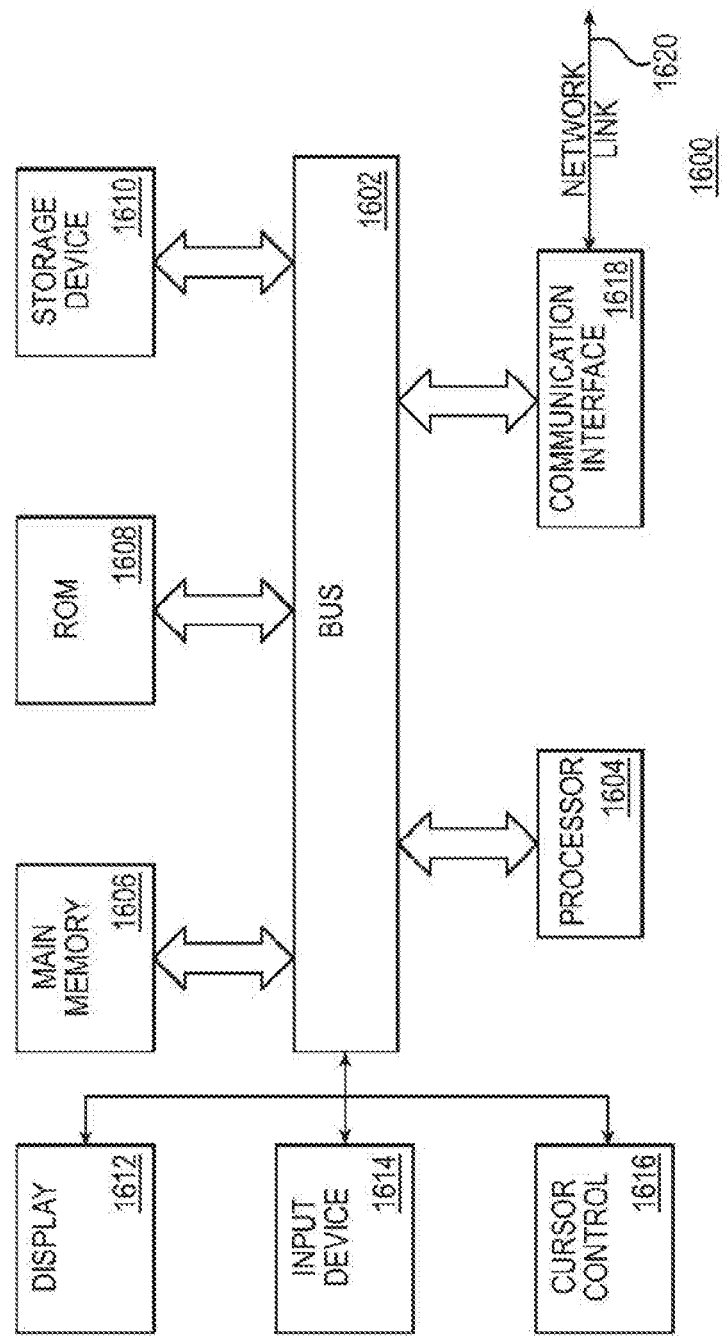
FIG. 16 is a block diagram illustrating an example of a computer system upon which an example embodiment can be implemented.

FIG. 16 is a block diagram illustrating an example of a computer system 1600 upon which an example embodiment can be implemented. For example, computer system 1600 may be employed to implement the functionality of control logic 402 described in FIG. 4.

Computer system 1600 includes a bus 1602 or other communication mechanism for communicating information and a processor 1604 coupled with bus 1602 for processing information. Computer system 1600 also includes a main memory 1606, such as random access memory (RAM) or other dynamic storage device coupled to bus 1602 for storing information and instructions to be executed by processor 1604. Main memory 1606 also may be used for storing a temporary variable or other intermediate information during execution of instructions to be executed by processor 1604. Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612 such as a cathode ray tube (CRT) or liquid crystal display (LCD), for displaying information to a computer user. An input device 1614, such as a touch screen with alphanumeric and other keys is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g. x) and a second axis (e.g. y) that allows the device to specify positions in a plane. In an example embodiment, the cursor control 1616 is responsive to gestures.

An aspect of the example embodiment is related to the use of computer system 1600 for implementing an automated banking machine as described in the example embodiments herein. According to an example embodiment, the functionality of the automated banking machine is provided by computer system 1600 in response to processor 1604 executing one or more sequences of one or more instructions contained in main memory 1606. Such instructions may be read into main memory 1606 from another computer-readable medium, such as storage device 1610. Execution of the sequence of instructions contained in main memory 1606 causes processor 1604 to perform the process steps described herein. One or more processors in a multi-processing arrangement may also be employed to execute the sequences of instructions contained in main memory 1606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1604 for execution. Such a medium may take many forms, including but not limited to non-volatile media. Non-volatile media include for example optical or magnetic disks, such as storage device 1610. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Figure 17:
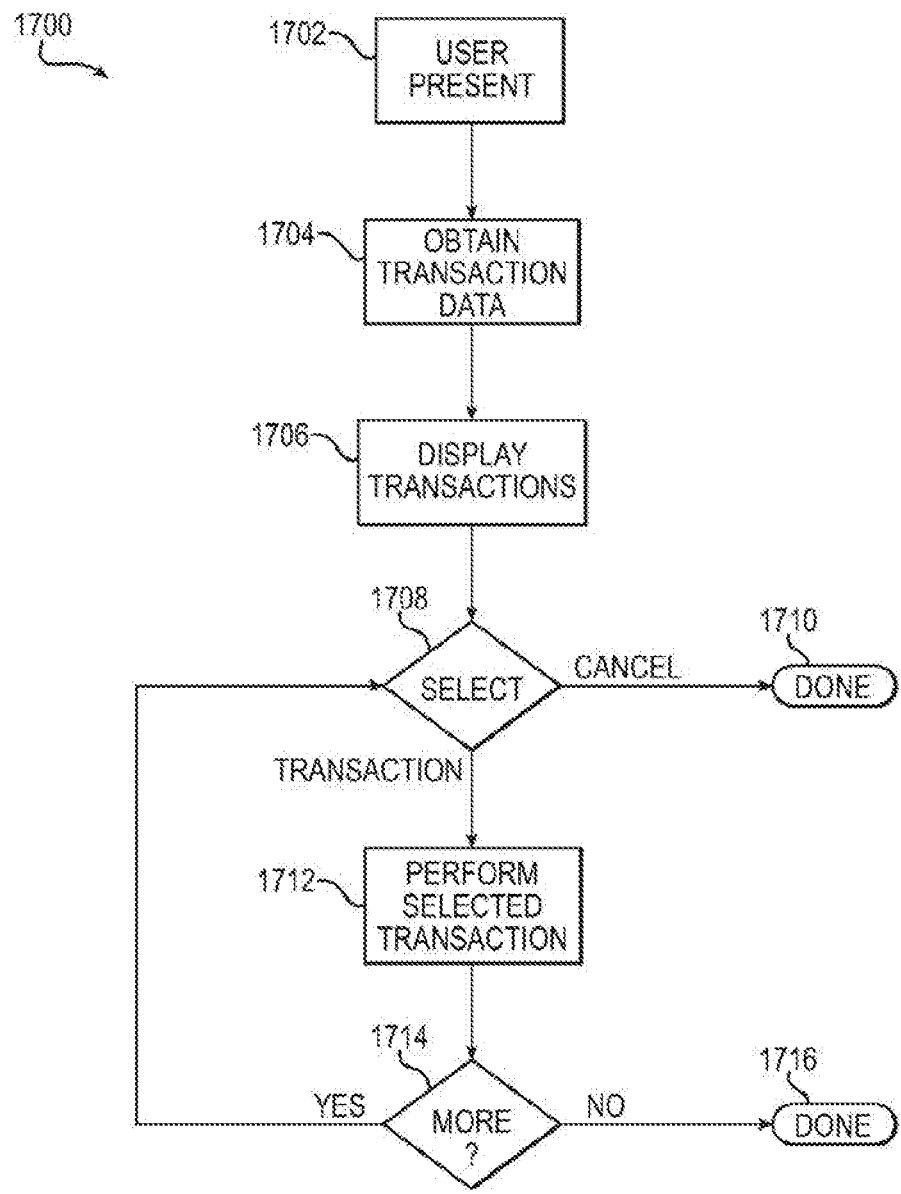
FIG. 17 is a block diagram illustrating an example of a methodology for conducting transactions on an automated banking machine.

Computer system 1600 also includes a communication interface 1618 coupled to bus 1602. Communication interface 1618 provides a two-way data communication coupling computer system 1600 to a network link 1620 that is connected to a network, such as for example network 418 in FIG. 4. For example, communication interface 1618 may be a local area network (LAN) card to provide a data communication connection to a compatible LAN. As another example, communication interface 1618 may be an integrated services digital network (ISDN) card or a modem to provide a data communication connection to a corresponding type of telephone line. Wireless links may also be implemented. In any such implementation, communication interface 1618 sends and receives electrical, electromagnetic, or optical signals that carry digital data streams In view of the foregoing structural and functional features described above, a methodology 1700 in accordance with an example embodiment will be better appreciated with reference to FIG. 17. While, for purposes of simplicity of explanation, the methodology 1700 of FIG. 17 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required in an example embodiment. The methodology 1700 described herein is suitably adapted to be implemented in hardware, software when executed by a processor, or a combination thereof. For example, the methodology 1700 may be implemented b control logic 402 in FIG. 4.

At 1702, the presence of a user is detected. For example, a user may be detected responsive to the user tapping their mobile phone onto user interface 600 (FIG. 6).

At 1704, transaction data is obtained. In an example embodiment, queued transaction data may be obtained from the user's mobile phone. In other embodiments, the mobile phone may send the queued transaction to the financial institution's network (e.g., control logic 42 can be retrieve the queued transaction data via network 422).

At 1706, transactions are displayed. The transactions can be displayed in any order. The user may selectively cancel a transaction from the queue, or may cancel all queued transactions.

At 1708, a computer determination is made whether the user selected a transaction or decided to cancel the queued transaction. If there are no transactions in the queue (e.g., all displayed queued transactions were canceled) then at 1710 the methodology 1700 is completed. The user session may also be terminated, or the user may be provided with a menu for conducting transactions.

At 1712, the selected transaction is performed. For example, if a cash withdrawal was requested, cash is delivered to the terminal's cash interface. For example, using the embodiment illustrated in FIG. 4, the control logic 402 sends a command to the safe 418 to deliver the cash to the appropriate cash interface 416. Logic (not shown) in the safe 418 provides the cash to the appropriate cash interface (e.g., either the cash interface 416 of the first terminal 404 or the second terminal 406) as instructed.

As another example, if the requested transaction is a deposit, the user may be prompted to enter an account, or account data may be received from the queued transaction. In addition, the user can be prompted to scan the item being deposited as described herein.

At 1714, a determination is made whether there are any more queued transactions. If there are queued transactions remaining (YES), control returns to 1706 where the remaining transactions are displayed. If there are no displayed transactions (NO), at 1716 methodology 1700 terminates. The user session may be terminated or the user may be provided with a menu for conducting further transactions.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. An apparatus, comprising:
a display;
a touch screen interface coupled with the display;
a scanner coupled with the display and positioned to optically scan items in contact with the display;
a controller coupled with the display, the touch screen interface, and the scanner;

the controller is operable to determine a plurality of accounts;

the controller is responsive to receiving a request to deposit a plurality of deposit items to concurrently display data representative of the plurality of accounts, the data representative of the plurality of accounts comprises images representative of the plurality of accounts;

the controller is operable to request the plurality of deposit items be placed on the display;

the controller is operable to have the scanner obtain images of the plurality of deposit items, the images comprise a first image of a scanned first deposit item and a second image of a scanned second deposit item;

the controller is operable to concurrently display the first image and the second image;

the controller is operable to receive data representative of one of a group consisting of a manual touch of the touch screen and a gesture starting at the first image representative of the first deposit item and ending at a selected first of the images that is representative of a selected first of the concurrently displayed plurality of accounts; and the controller is operable to cause the first deposit item to be deposited into the selected first of the plurality of accounts responsive to receiving data representative of one of a group consisting of a manual touch of the touch screen and a gesture starting at the first image and ending at a selected first of the images that is representative of a selected first of the plurality of accounts;

the controller is operable to receive data representative of one of a group consisting of a manual touch of the touch screen and a gesture starting at the second image representative of the second deposit item and ending at a selected second of the images that is representative of a selected second of the concurrently displayed plurality of accounts; and the controller is operable to cause the second deposit item to be deposited into the selected second of the plurality of accounts;

wherein the images representative of the plurality of accounts remain on the display while the first deposit item is deposited into the selected first one the plurality of accounts and the second deposit item is deposited into the second of the plurality of accounts wherein the first account is selected after the one of a group consisting of the manual touch of the touch screen and the gesture ends at the selected first of the images that is representative of the selected first of the plurality of accounts; and wherein the second account is selected after the one of a group consisting of the manual touch of the touch screen and the gesture ends at the selected second of the images that is representative of the selected second of the plurality of accounts.

2. The apparatus set forth in claim 1, wherein the selected first of the plurality of accounts is the same as the selected second of the plurality of accounts.

3. The apparatus set forth in claim 1, wherein the controller is operable to display a first color in an area around a perimeter of the first display item to indicate scanning of the first deposit item is in progress.

4. The apparatus set forth in claim 3, wherein the controller is operable to display a second color in an area around a perimeter of the first display item to indicate scanning of the first deposit item has completed.

5. The apparatus set forth in claim 4, the controller is operable to obtain data representative of the first deposit item from the image of the first deposit item;

the controller is operable to request the first deposit item be removed from the display; and the controller is operable cause the data representative of the first deposit item to be displayed on the display.

6. The apparatus set forth in claim 5, the controller is operable to allow the data representative of the first deposit item to be edited via the touch screen interface.

7. The apparatus set forth in claim 6, wherein the first deposit item is a check.

8. The apparatus set forth in claim 1, further comprising a first terminal having a first user interface, the first user interface comprises the display, the touch screen interface coupled with the display, and the scanner;

the first terminal further comprises a first wireless interface, and a first cash interface;

a second terminal having a second user interface, the second user interface comprises a second display, a second touch screen interface coupled with the second display and a second scanner operative to scan items in contact with the second display, a second wireless interface, and a second cash interface;

the controller is coupled with the first user interface and the second user interface and operable to control the operation of the first and second displays, first and second wireless interfaces, and first and second cash interfaces; and a safe coupled with the control logic, and the first and second cash interfaces;

wherein the control logic is operable to have cash selectively delivered from the safe to the first cash interfaces responsive to cash withdrawal transactions conducted at the first terminal and to the second cash interface responsive to cash withdrawal transactions conducted at the second terminal.

9. The apparatus set forth in claim 8, the controller is operable to receive data representative of a user via the first wireless interface;

the controller is operable to determine a queued transaction for the user; and the control logic is operable to display on the first display, data representative of the first transaction.

10. The apparatus set forth in claim 9, the controller is operable to receive data representative of a user via the first wireless interface;

the controller is operable to receive data representative of a plurality of queued transactions via the first wireless interface; and the controller is operable to cause data representative of the plurality of queued transactions to be displayed on the display.

11. The apparatus set forth in claim 10, the controller is operable to receive a selection of a selected one of the plurality of queued transactions via the touch screen interface; and the controller is operable to initiate the selected one of the plurality of queued transactions responsive to receiving the selection.

12. The apparatus set forth in claim 11, the controller is operable to receive data representative of a second user via the second wireless interface;

the controller is operable to determine a second queued transaction for the second user; and the control logic is operable to display on the second display, data representative of the second transaction while the first terminal is communicating with the first user.

13. The apparatus set forth in claim 11,
the controller is operable to receive data representative of a second user via the first wireless interface;
the controller is operable to receive data representative of a second plurality of queued transactions via the second wireless interface; and
the controller is operable to cause data representative of the second plurality of queued transactions to be displayed on the second display concurrently while communicating with the first user on the first display.

14. The apparatus set forth in claim 13,
the controller is operable to receive a selection of a selected one of the plurality of queued transactions via the touch screen interface; and
the controller is operable to initiate the selected one of the plurality of queued transactions responsive to receiving the selection.

15. The apparatus set forth in claim 8, wherein the first wireless interface is a near field communication (NFC) interface.

16. The apparatus set forth in claim 1, wherein the first user interface is on a horizontal plane, the apparatus further comprises:
a second user interface, the second user interface comprises a second display, an audio output, and an audio input and a video input;
wherein the second user interface is located on a vertical plane with respect to the first user interface; and
the controller is operable to conduct a videoconference via the second interlace while concurrently performing a transaction via the first interface.

17. A method, comprising:
obtaining data representative of a user
determining, from the data representative of a user, a plurality of accounts associated with the user;
receiving a request for a deposit transaction;
displaying images representing the plurality of accounts concurrently on a display device responsive to receiving the request for the deposit transaction;
outputting data with instructions to provide deposit items within a predefined area of the display device;
operating a scanner to scan the deposit items;
providing instructions to remove the deposit items from the display;
displaying, concurrently on the display device, images representative of scanned deposit items within predefined areas associated with the deposit items when scanned;
receiving data representative of a manual touch on a touch screen associated with the display device, the manual touch being in the predefined area of a first deposit item;
receiving data indicating movement of the manual touch from the first deposit item to a first image that is representative of a selected first of the plurality of accounts;
depositing the deposit item into the selected first of the plurality of accounts responsive to the movement of the deposit item to the first image hat is representative of the selected first of the plurality of accounts;
receiving data representative of a manual touch on a touch screen associated with the display device, the manual touch being in the predefined area of a second deposit item;
receiving data indicating movement of a second manual touch from the second deposit item to a second image that is representative of a selected second of the plurality of accounts;
depositing the deposit item into the selected second of the plurality of accounts responsive to the movement of the second deposit item to the image of the selected second of the plurality of accounts;
wherein the images representative of the plurality of accounts remain on the display device concurrently while the first deposit item is deposited into the selected first one the plurality of accounts and the second deposit item is deposited into the second of the plurality of accounts;
wherein the first account is selected after movement of first deposit item to first image; and
wherein the second account is selected after movement of the second item to second image.

18. A tangible, non-transient computer readable medium of instructions having computer readable instructions encoded thereon for execution by a processor and upon execution are operable to:
obtain data representative of a user;
determine, from the data representative of a user, a plurality of accounts associated with the user;
receive a request for a deposit transaction;
cause images representing the plurality of accounts to be displayed on a display device responsive to receiving the request for the deposit transaction;
output data on a display coupled with the processor with instructions to provide deposit items within a predefined area of a display;
operate a scanner to scan the deposit items;
causing images representative of scanned deposit items to be displayed concurrently in predefine areas associated with the deposit items when scanned;
receive data representative of a manual touch on a touch screen associated with the display device, the manual touch being in the predefined area of a first deposit item;
receive data indicating movement of the manual touch from the first deposit item to a first image that is representative of a selected first of the plurality of accounts; and
deposit the deposit item into the selected first of the plurality of accounts responsive to the movement of the deposit item to the image of the selected first of the plurality of accounts;
receive data representative of a manual touch on a touch screen associated with the display device, the manual touch being in the predefined area of a second deposit item;
receiving data indicating movement of the manual touch from the second deposit item to a second image that is representative of a selected second of the plurality of accounts;
depositing the deposit item into the selected second of the plurality of accounts responsive to the movement of the second deposit item to the image of the selected second of the plurality of accounts;
wherein the images representative of the plurality of accounts remain on the display device concurrently while the first deposit item is deposited into the selected first one the plurality of accounts and the second deposit item is deposited into the second of the plurality of accounts;
wherein the first account is selected after movement of first deposit item to first image; and
wherein the second account is selected after movement of the second item to second image.

\* \* \* \* \*